3,294,854
CYCLIC OCTENE PRODUCTION
Lynn H. Slaugh, Pleasant Hill, Calif., assignor to Shell Oil Company, New York, N.Y., a corporation of Delaware
No Drawing. Filed Apr. 23, 1964, Ser. No. 362,198
13 Claims. (Cl. 260—666)

This invention relates to a novel process for the production of cyclic octenes. More particularly it relates to the conversion of cyclooctadienes to related compounds possessing a single ethylenic linkage.

It is an object of the present invention to provide a novel method for the production of cyclic octenes. A further object is to provide a novel process whereby cyclooctadienes are selectively reduced or alternatively are isomerized to cyclic compounds possessing a single ethylenic linkage. A particular object is to provide a process for the selective hydrogenation of cyclooctadienes to cyclooctene.

It has now been found that these objects are accomplished by the process of contacting a cyclooctadiene with certain metal hydride catalysts in the presence of or in the substantial absence of molecular hydrogen. The process of the invention typically produces a mixture of a cyclooctene reduction product and a bicyclo(3.3.0)oct-2-ene isomerization product, the relative proportions of the cyclic octene products being largely determined by the reaction conditions.

The metal hydrides which have been found to be useful catalysts are hydrides of active metals, particularly metal hydrides containing from 1 to 2 metals preferably 1, at least one of which metals is an alkali metal or alkaline earth metal, generically designated alkali(ne earth) metals. Thus, individual alkali metal or alkaline earth metals hydrides are suitable, as are mixtures of two or more alkali (ne earth) metal hydrides and "mixed" or "complex" metal hydrides, which terminology is employed to indicate metal hydrides wherein an alkali(ne earth) metal, preferably an alkali metal, is associated with other metal, preferably a metal of Group III of the Periodic Table, in a hydride of definite composition containing moieties of both metals and acting chemically as a single compound. Illustrative of alkali metal hydrides are lithium hydride, sodium hydride, potassium hydride and cesium hydride, whereas alkaline earth metal hydrides are represented by calcium hydride and barium hydride and "mixed" hydrides include lithium aluminum hydride, lithium borohydride and sodium borohydride. In general, single alkali(ne earth) metal hydrides are preferred over mixtures of alkali(ne earth) metal hydrides or "mixed" hydrides, and especially preferred are the hydrides of the more active alkali(ne earth) metals. One measure of metallic activity is in terms of the first ionization potential of the metal, that is, the energy required to remove to infiinte distance the most loosely held electron of the metal. This energy is generally expressed in terms of electron volts, and varies inversely with the activity of the metal. A representative table of ionization potentials of various elements is given in "Handbook of Chemistry and Physics," Chemical Rubber Publishing Company, Cleveland, Ohio, 44th ed., page 2647. Hydrides of alkali(ne earth) metals whose first ionization potential is below 6.5 e.v. are most satisfactorily utilized, although best results are obtained when a hydride of an alkali(ne earth) metal having a first ionization potential below 5.2 e.v. is employed. Most preferred as the alkali(ne earth) metal hydride, in part because of the availability thereof, is potassium hydride.

The metal hydride catalyst is employed as a preformed material or alternatively is prepared in situ as by adding to the reaction mixture a metal alkyl or similar organometallic and subsequently reacting the hydride precursor with molecular hydrogen.

The cyclooctadiene reactant is a monocyclic hydrocarbon compound having a ring system of 8 carbon atoms and incorporating 2 ethylenic linkages, i.e., non-aromatic carbon-carbon double bonds, within the ring. The ring carbons possess only hydrogen substituents or alternatively are substituted with from 1 to 6 hydrocarbyl substituents which independently have from 1 to 10 carbon atoms and are preferably free from non-aromatic unsaturation. Illustrative of such hydrocarbyl substituents are methyl, ethyl, propyl, sec-butyl, decyl, phenyl, benzyl, tolyl, p-tert-butylphenyl, cyclohexyl and the like. Preferred cyclooctadiene reactants, however, have only hydrogen substituents on the ring carbon atoms.

The process of the invention is operative regardless of the relative location of the double bonds in the cyclooctadiene reactant. It will be appreciated that the cyclic structure of the reactant virtually precludes the presence of adjacent ethylenic linkages, e.g., allene moieties. The remaining three isomeric cyclooctadienes, i.e., 1,3-cyclooctadiene, 1,4-cyclooctadiene and 1,5-cyclooctadiene, are preferably utilized in the process of the invention.

The process of the invention comprises contacting the cyclooctadiene reactant with the metal hydride catalyst in the presence of or in the substantial absence of hydrogen at a somewhat elevated temperature and generally at elevated pressure. The reaction is broadly represented by the equation below wherein 1,3-cyclooctadiene is employed as a representative reactant.

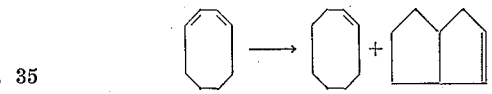

Although both cyclooctene and bicyclo(3.3.0)oct-2-ene are observed as products, the relative proportions of these products is largely determined by the reaction conditions employed, e.g., the reaction temperature, and by the amount of hydrogen present in the reaction system. When hydrogen is absent, or present only in small quantities, the bicyclo(3.3.0)oct-2-ene is the predominant product. Alternatively, when larger amounts of molecular hydrogen are employed, the production of cyclooctene is favored.

Although the reaction may be conducted in a continuous manner as by passing the reactants through a heated tube in which the catalyst is contained, best results are obtained when the reaction is conducted in a batchwise manner as in an autoclave or similar reactor. The reaction is satisfactorily conducted in the absence of reaction solvent, but is preferably conducted in liquid-phase solution in a reaction solvent that is inert under reaction conditions to the cyclic reactants and the products produced therefrom as well as the metal hydride catalyst and hydrogen. The reaction solvent therefore contains no labile hydrogen atoms. Illustrative of such inert reaction solvents are the ethers including acylic mono-ethers such as diethyl ether, dipropyl ether, methyl butyl ether and anisole, acyclic poly-ethers such as the lower alkyl ethers (full) of polyhydric alcohols including ethylene glycol, diethyene glycol, tetraethylene gycol, gycerol and 1,2,6-hexane triol wherein the alkyl moieties have from 1 to 4 carbon atoms, and cyclic ethers such as tetrahydrofuran, tetrahydropyran, 1,4-dioxane, 1,3-dioxane and 1,3-dioxolane; the tertiary amines, particularly trialkylamines such as triethylamine, tripropylamine and trihexylamines; and aliphatic hydrocarbons such as hexane, heptane, decane and the like. Preferred as reaction solvents are the ethers, especially the cyclic ethers, and particularly preferred is tetrahydrofuran. It is, of course, preferred to conduct the reaction under substantially anhydrous conditions, as the presence of moisture results in the hydrolysis of the hydride catalyst. Small amounts of water may be tolerated, however, if excess metal hydride is employed.

The metal hydride catalyst is employed in minor amounts. Amounts of hydride from about 1% mole to about 30% mole based upon the cyclooctadiene are satisfactory, although amounts of hydride from about 5% mole to about 25% mole on the same basis are preferred. It is occasionally desirable in conducting the process of the invention to additionally add a basic co-catalyst. Without wishing to be bound by any particular theory, it appears that one role of the hydride catalyst is to encourage migration of the ethylenic bonds to positions wherein they are conjugated, should such relationship not be originally present. The presence of a basic co-catalyst appears to promote bond isomerization, thereby increasing the rate of reaction, particularly the rate of hydrogenation. Co-catalysts that are suitable are strongly basic and yet possess no labile hydrogens that would result in hydride decomposition. Although metallic derivatives of secondary amines, particularly alkali metal derivatives such as sodium diethylamide, are satisfactory, best results are obtained when the co-catalyst is a metal alkoxide, particularly the alkali(ne earth) metal salts of lower monohydric alkanols, e.g., sodium methoxide, potassium ethoxide, lithium isopropoxide, potassium tert-butoxide, barium butoxide and the like. It should be understood that no co-catalyst is required in the process of invention, but when employed, molar amounts of co-catalyst up to about twice the molar amount of metal hydride catalyst are satisfactory.

The process of the invention is typically conducted by charging the cyclooctadiene, catalyst and solvent, if solvent is employed, to the reaction vessel. In the modification of the invention wherein no substantial amount of hydrogen is present, the reaction mitxure is raised to the desired temperature and maintained until reaction is complete. The principal product formed in the substantial absence of hydrogen is, as previously stated, bicyclo(3.3.0)oct-2-ene. In the alternate modification of the process, added molecular hydrogen is employed to promote reduction of the cyclocotadiene reactant. The effective amount of hydrogen added is conveniently measured in terms of the hydrogen pressure created when molecular hydrogen is added to the reaction vessel while at ambient temperature, e.g., 20-30° C. It is of course within the contemplated scope of the invention to conduct the process in the presence of no added hydrogen pressure. To promote reduction, however, hydrogen pressures up to about 3500 p.s.i.g. are suitably employed. Although higher pressures are operable, little is gained by the use of such higher pressures. Satisfactory results are obtained when initial hydrogen pressures up to about 3000 p.s.i.g. are employed, and the hydrogen pressure range from about 700 p.s.i.g. to about 2500 p.s.i.g. is particularly suitable for cyclooctene production.

When the reactants, catalyst and solvent, if any, have been added to the reaction vessel, the vessel is sealed and maintained at reaction temperature until reaction is complete, typically a period of several hours. Reaction temperatures that are from about 50° C. to about 350° C. are suitable, although temperatures from about 100° C. to about 250° C. are preferred. Subsequent to reaction, the product mixture is separated and recovered by conventional methods, as by fractional distillation, selective extraction, chromatographic methods and the like.

The mono-olefinic products of the invention find many applications as chemical intermediates. The ethylenic linkage is hydrated or hydroxylated to form useful alcohols from which conventional derivatives are prepared. The ethylenic linkage may be epoxidized to form useful epoxy resin precursors or is employed as a reactive site for polymerization or co-polymerization with other reactive monomers. The cyclooctene product has established utility as a precursor for α,ω-dienes, α,ω-dicarboxylic acids and related derivatives.

To further illustrate the novel process of the invention, the following examples are provided. It should be understood that they are not to be regarded as limitations, as the teachings thereof may be varied as will be understood by one skilled in this art.

*Example I*

To an 80 ml. autoclave filled with nitrogen were charged 40 ml. of anhydrous tetrahydrofuran, 0.1 mole of 1,5-cyclooctadiene and 0.02 mole of potassium hydride. The autoclave was sealed and heated at 190° C. for 4 hours. The product mixture was analyzed by gas-liquid chromatographic analysis and found to contain 5.4% cyclooctene, 65.4% bicyclo(3.3.0)oct-2-ene, 3.8% 1,3-cyclooctadiene and 15.3% unreacted starting material, all percentages based upon starting material. The products were separated by gas-liquid chromatographic trapping techniques, and identified by comparison of their infrared and nuclear magnetic resonance spectra and their mass spectrographic cracking pattern with those of authentic materials.

*Example II*

The procedure of Example I was followed without the addition of solvent employing 0.47 mole of 1,5-cyclooctadiene and 0.02 mole of potassium hydride. The product mixture contained 3.3% cyclooctene, 80.4% bicyclo-(3.3.0)oct-2-ene, 0.7% 1,3-cyclooctadiene and 11.5% 1,5-cyclooctadiene.

*Example III*

The procedure of Example I was followed employing 0.1 mole of 1,5-cyclooctadiene, 0.02 mole of sodium hydride and a reaction time of 6 hours. The product mixture contained 3.6% cyclooctene, 5.7% bicyclo(3.3.0)-oct-2-ene, 3.2% 1,3-cyclooctadiene and 87% unreacted starting material.

When this experiment was repeated without the addition of the hydride catalyst, no isomerization was observed and 99.4% of the cyclooctadiene reactant was recovered.

*Example IV*

The procedure of Example I was followed employing 20 ml. of anhydrous tetrahydrofuran, 0.1 mole of 1,3-cyclooctadiene and 0.02 mole of potassium hydride. The product mixture contained 5.3% cyclooctene, 89% bicyclo(3.3.0)oct-2-ene and 0.7% 1,3-cyclooctadiene.

*Example V*

The procedure of Example III was followed employing 20 ml. of anhydrous tetrahydrofuran, 0.05 mole of 1,5-cyclooctadiene and 0.01 mole of lithium hydride. The product mixture contained 1% cyclooctene, 1.2% bicyclo-(3.3.0)oct-2-ene, 6.8% 1,3-cyclooctadiene and 91.2% unreacted starting material.

A similar experiment employing 0.01 mole of calcium hydride yielded a product mixture which contained 1% bicyclo(3.3.0)oct-2-ene, 2% 1,3-cyclooctadiene and 97% unreacted starting material.

*Example VI*

To an 80 ml. autoclave was charged 0.1 mole of 1,3-cyclooctadiene, 40 ml. of anhydrous tetrahydrofuran and 0.02 mole of sodium hydride. Hydrogen was added until a pressure of 1780 p.s.i.g. was obtained, and the autoclave was sealed and heated at 195° C. for 6 hours. The reactor was cooled and opened and the product mixture was found by gas-liquid chromatographic analysis to consist of 25% cyclooctene, 18% bicyclo(3.3.0)oct-2-ene and 57% unreacted starting material, all percentages being based upon the original cyclooctadiene.

*Example VII*

The procedure of Example VI was repeated employing 0.02 mole of potassium hydride as catalyst, a hydrogen pressure of 1600 p.s.i.g., a reaction temperature of 100° C. and a reaction time of 4 hours. The product mixture consisted of 19.5% cyclooctene, 17.4% bicyclo(3.3.0)oct-2-ene and 63.1% unreacted starting material.

When the potassium hydride was replaced with 0.02 mole of lithium aluminum hydride and the reaction temperature raised to 190° C., the product mixture contained 43.7% cyclooctene, 2% bicyclo(3.3.0)oct-2-ene, 1.9% 1,5-cyclooctadiene and 46.5% unreacted starting material.

*Example VIII*

To an 80 ml. autoclave was charged 0.1 mole of 1,5-cyclooctadiene, 0.02 mole of sodium hydride and 40 ml. of tetrahydrofuran. Hydrogen was introduced to give a pressure of 740 p.s.i.g., and the reactor was then heated to 190–240° C. and maintained at that temperature for 1.5 hours. Analysis of the product mixture thereby obtained indicated 3.6% cyclooctene, 8.4% bicyclo(3.3.0)-oct-2-ene, 8.3% 1,3-cyclooctadiene and 79.7% unreacted starting material.

*Example IX*

To an 80 ml. autoclave was charged 0.1 mole of 1,5-cyclooctadiene, 0.02 mole of potassium hydride, 0.02 mole of potassium tert-butoxide and 40 ml. of anhydrous tetrahydrofuran. Hydrogen was introduced to give a pressure of 1580 p.s.i.g., and the mixture was maintained at 150° C. for 1.5 hours. Analysis of the product mixture indicated 70% cyclooctene, 18.8% bicyclo(3.3.0)oct-2-ene, 1.1% 1,3-cyclooctadiene and 2.4% 1,5-cyclooctadiene.

I claim as my invention:

1. The process for the production of cyclic octenes by contacting in a reaction zone cyclooctadiene and metal hydride containing from 1 to 2 metals, at least one of which is selected from the group consisting of alkali and alkaline earth metal, introducing sufficient molecular hydrogen to provide a hydrogen pressure of from 0 p.s.i.g. to about 3500 p.s.i.g., and maintaining the mixture obtained thereby at a temperature from about 50° C. to about 350° C.

2. The process for the production of cyclic octene by contacting in a reaction zone cyclooctadiene and a hydride selected from the group consisting of alkali and alkaline earth metal, introducing sufficient molecular hydrogen to provide a hydrogen pressure of from 0 p.s.i.g. to about 3500 p.s.i.g., and maintaining the mixture obtained thereby at a temperature from about 50° C. to about 350° C.

3. The process for the production of cyclic octene by contacting in a reaction zone cyclooctadiene and a hydride selected from the group consisting of alkali and alkaline earth metal, introducing sufficient molecular hydrogen to provide a hydrogen pressure of from 0 p.s.i.g. to about 3000 p.s.i.g., maintaining the mixture obtained thereby at a temperature from about 100° C. to about 250° C., and recovering cyclic octene from the resulting product mixture.

4. The process for the production of cyclooctene by contacting in a reaction zone cyclooctadiene and a hydride selected from the group consisting of alkali and alkaline earth metal, adding sufficient molecular hydrogen to provide a hydrogen pressure from about 700 p.s.i.g. to about 2500 p.s.i.g., and maintaining the mixture thereby obtained at a temperature from about 100° C. to about 250° C.

5. The process of claim 4 wherein the metal hydride is the hydride selected from the group consisting of alkali and alkaline earth metal having a first ionization potential below 6.5 electron volts.

6. The process of claim 4 wherein the metal hydride is potassium hydride.

7. The process of claim 4 wherein the metal hydride is sodium hydride.

8. The process for the production of bicyclo(3.3.0)oct-2-ene by contacting cyclooctadiene and a hydride selected from the group consisting of alkali and alkaline earth metal in a reaction zone in the substantial absence of molecular hydrogen, and maintaining the mixture thereby obtained at a temperature from about 100° C. to about 250° C.

9. The process of claim 8 wherein the metal hydride is the hydride selected from the group consisting of alkali and alkaline earth metal having a first ionization potential below 6.5 electron volts.

10. The process of claim 8 wherein the hydride is potassium hydride.

11. The process of claim 8 wherein the hydride is calcium hydride.

12. The process of claim 8 wherein the hydride is sodium hydride.

13. The process of claim 8 wherein the hydride is lithium hydride.

References Cited by the Examiner

FOREIGN PATENTS 1,337,889  9/1963  France.

OTHER REFERENCES

Wolfram Grimme, Berichte, Jahrg, 98, 1965, pp. 756–763.

DELBERT E. GANTZ, *Primary Examiner.*

V. O'KEEFE, *Assistant Examiner.*